United States Patent
Hwang et al.

(10) Patent No.: US 7,912,725 B2
(45) Date of Patent: Mar. 22, 2011

(54) METHOD AND SYSTEM FOR PROVIDING NEWS INFORMATION BY USING THREE DIMENSIONAL CHARACTER FOR USE IN WIRELESS COMMUNICATION NETWORK

(75) Inventors: Inseong Hwang, Seoul (KR); Jongmin Kim, Seoul (KR); Hoojong Kim, Seoul (KR); Wonhee Sull, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 902 days.

(21) Appl. No.: 11/815,242

(22) PCT Filed: Feb. 15, 2006

(86) PCT No.: PCT/KR2006/000527
§ 371 (c)(1),
(2), (4) Date: Aug. 1, 2007

(87) PCT Pub. No.: WO2006/088313
PCT Pub. Date: Aug. 24, 2006

(65) Prior Publication Data
US 2009/0125312 A1    May 14, 2009

(30) Foreign Application Priority Data
Feb. 15, 2005    (KR) .......................... 10-2005-0012313

(51) Int. Cl.
*G10L 21/00*    (2006.01)
*H04L 29/02*    (2006.01)
(52) U.S. Cl. ...................... 704/270; 704/260; 455/414.3
(58) Field of Classification Search ................. 704/260, 704/270, 270.1, 275; 455/414.3, 414.4, 416, 455/417
See application file for complete search history.

(56) References Cited

U.S. PATENT DOCUMENTS

| | | | |
|---|---|---|---|
| 6,539,354 B1 * | 3/2003 | Sutton et al. | 704/260 |
| 7,203,648 B1 * | 4/2007 | Ostermann et al. | 704/260 |
| 2002/0010589 A1 * | 1/2002 | Nashida et al. | 704/275 |
| 2002/0024519 A1 | 2/2002 | Park | |

FOREIGN PATENT DOCUMENTS

| | | |
|---|---|---|
| JP | 2003-060811 | 2/2003 |
| JP | 2003-521750 | 7/2003 |

OTHER PUBLICATIONS

Hong et al.; Real-Time Speech-Driven 3D Face Animation; Proceedings of the First International Symposium on 3D data Processing Visualization and Transmission, 2002, pp. 713-716.* Office Action dated Dec. 1, 2009, for Japanese Application No. 2007-553050, citing the above references.

* cited by examiner

*Primary Examiner* — Abul Azad
(74) *Attorney, Agent, or Firm* — Lowe Hauptman Ham & Berner LLP (57) ABSTRACT

Disclosed is a method for providing by a news information-providing server news information using a 3D character to a wireless communication terminal having accessed the news information-providing server through a wireless communication network, the method including the steps of: (a) generating voice information by converting news information received in real-time into voice data, and analyzing content of the voice information; (b) extracting mouth shape data and facial expression data corresponding to the content of the voice information analyzed at step (a); (c) applying the mouth shape data and facial expression data to the 3D character, and generating 3D character data by synthesizing the 3D character with an background image and/or background music; (d) generating 3D character news by synchronizing the voice information with the 3D character data; and (e) transmitting the 3D character news to the wireless communication terminal in a streaming mode.

10 Claims, 5 Drawing Sheets

METHOD AND SYSTEM FOR PROVIDING NEWS INFORMATION BY USING THREE DIMENSIONAL CHARACTER FOR USE IN WIRELESS COMMUNICATION NETWORK

CROSS REFERENCE TO RELATED APPLICATION

This application is the National Phase application of International Application No. PCT/KR2006/000527, filed Feb. 15, 2006, which designates the United States and was published in English. This application, in its entirety, is incorporated herein by reference.

TECHNICAL FIELD

The present invention relates to a method and a system for providing news information by using a three-dimensional (hereinafter, referred to as 3D) character for use in a wireless communication network. More particularly, the present invention relates to a method and a system for providing news information by using a 3D character for use in a wireless communication network, in which the content of voice information obtained by converting real-time news information into voice data is analyzed, mouth shape data and facial expression data corresponding to the analyzed content of the voice information are extracted, the extracted mouth shape data and facial expression data are applied to a 3D character, 3D character data are generated by synthesizing the 3D character with an background image and/or background music, 3D character news are generated by synchronizing the 3D character data with the voice information, and the 3D character news are transmitted to a wireless communication terminal in a streaming mode.

BACKGROUND ART

With the establishment of the Internet based on a Transmission Control Protocol/Internet Protocol (TCP/IP), a system has been rapidly developed, in which a user can access the Internet by using his/her own computer in any place in which on-line connection is possible, and retrieve various information or transmit various data including characters, voice, images, moving pictures, etc., in real-time. Further, with the development of a wireless communication technology, a wireless Internet service has been activated, in which a user can use an Internet service based on mobility through a wireless communication network.

Accordingly, a service provided by a wireless communication system is being developed into a multimedia communication service capable of transmitting data, such as circuit data and packet data, as well as voice. In addition, hardware and software have also been developed, which can improve performance of a wireless communication terminal such as a mobile PC, a Personal Digital Assistant (PDA) and a mobile phone.

Nowadays, a wireless communication terminal has been replacing conventional personal computers, and it is possible to receive various types of content, such as a news-providing service, a music file download service, a game service and a bank (stock) business service, by means of a wireless communication terminal, which can perform high speed wireless communication, through a wireless communication network. The news-providing service enables a wireless communication terminal user to receive news information processed for a mobile use.

However, in an existing news-providing service provided to the wireless communication terminal, the wireless communication terminal user downloads and receives a series of automatic characters or news information provided through voice messages, which are previously stored in a server, or public broadcasting news are forwarded as is. Therefore, receiving the news information unilaterally from the server, the user cannot extract the information he desires, making the user receive even unnecessary information.

Further, a news-providing service provided in the form of text or voice message cannot give a feeling of presence like when a TV announcer actually performs a broadcast. Furthermore, since a news-providing service merely forwarding public broadcasting news involves audio and video signals, the service becomes monotonous. Therefore, it is impossible to satisfy the various information selection tastes of a user.

DISCLOSURE OF THE INVENTION

Therefore, the present invention has been made in view of the above-mentioned problems, and it is an object of the present invention to provide a method and a system for providing news information by using a 3D character for use in a wireless communication network, in which the content of voice information obtained by converting real-time news information into voice data is analyzed, mouth shape data and facial expression data corresponding to the analyzed content of the voice information are extracted, the extracted mouth shape data and facial expression data are applied to a 3D character, 3D character data are generated by synthesizing the 3D character with an background image and/or background music, 3D character news are generated by synchronizing the 3D character data with the voice information, and the 3D character news are transmitted to a wireless communication terminal in a streaming mode.

It is another object of the present invention to provide a method and a system which, even in the middle of providing a 3D character news service to a wireless communication terminal, can provide the 3D character news service to another wireless communication terminal, which has accessed a news information-providing server, starting from a predetermined segment of news, which corresponds to the access time point of said another wireless communication terminal.

It is further another object of the present invention to provide a method and a system for providing news information, which is created by wireless communication service subscribers itself, through 3D character news by using a mobile broadcasting server.

According to one aspect of the present invention, there is provided a method for providing news information by using a 3-dimensional (3D) character to a wireless communication terminal having accessed a news information-providing server through a wireless communication network, the method including the steps of: (a) generating voice information by converting news information into voice data, and analyzing content of the voice information; (b) extracting mouth shape data and facial expression data corresponding to the content of the voice information analyzed at step (a); (c) applying the mouth shape data and facial expression data to the 3D character, and generating 3D character data by synthesizing the 3D character with an background image and/or background music; (d) generating 3D character news by synchronizing the voice information with the 3D character data; and (e) transmitting the 3D character news to the wireless communication terminal in a streaming mode.

According to another aspect of the present invention, there is provided a method for providing 3-dimensional (3D) character news to a second wireless communication terminal having accessed a news information-providing server in the middle of providing the 3D character news to a first wireless communication terminal having accessed the news information-providing server through a wireless communication network, the method including the steps of: (a) receiving a news information request from the second wireless communication terminal, and generating streaming format data for use in synchronizing the 3D character news so that the 3D character news are provided to the second wireless communication terminal; (b) selecting sync marks included in the streaming format data as a reference time point, and generating the 3D character news by synchronizing 3D character data with voice information, the 3D character data being obtained by synthesizing a 3D character with an background image and/or background music; and (c) transmitting the 3D character news to the second wireless communication terminal in a streaming mode, starting from the reference time point.

According to further another aspect of the present invention, there is provided a news information-providing server for providing a news service expressed by a 3-dimensional (3D) character for a wireless communication terminal having accessed the news information-providing server through a wireless communication network, the news information-providing server including: a news information-providing unit for receiving and providing real-time news information including text data or voice data; a voice information converter for converting the news information including the text data into voice data; a voice analyzer for receiving voice information constituting the news information from the news information-providing unit or the voice information converter, and for analyzing content of the voice information; a lip sync processor for extracting mouth shape data corresponding to the content of the voice information analyzed by the voice analyzer; an animation processor for extracting facial expression data corresponding to the content of the voice information analyzed by the voice analyzer; a codec unit for converting the voice information, which is received from the voice analyzer, through a voice coding process; a memory for storing a 3D character, background images and background music; a 3D character synchronizer for applying the mouth shape data and the facial expression data to the 3D character, generating 3D character data by synthesizing the 3D character with the background image and/or the background music, and generating 3D character news by synchronizing the voice information outputted from the codec unit with the 3D character data; a streaming service unit for transmitting the 3D character news to the wireless communication terminal in a streaming mode; and a controller for controlling an operation of the news information-providing server so that the 3D character news are generated and transmitted to the wireless communication terminal.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiment of the present invention. It should be noted that the similar components are designated by similar reference numerals although they are illustrated in different drawings. Also, in the following description, a detailed description of known functions and configurations incorporated herein will be omitted when it may obscure the subject matter of the present invention.

Figure 1:
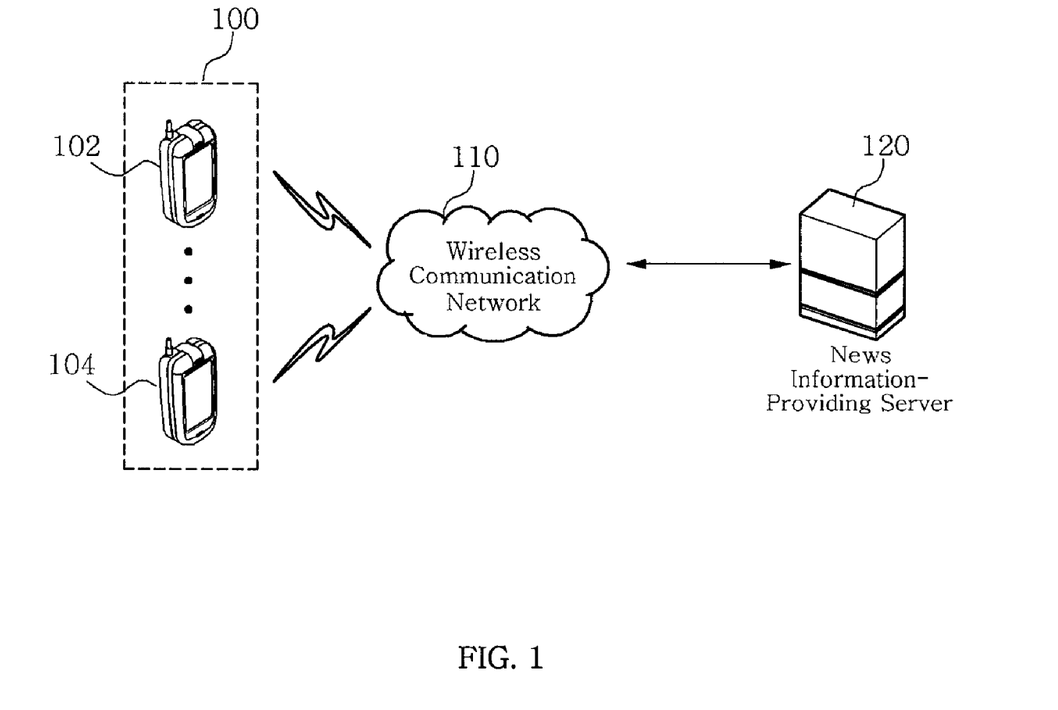
FIG. 1 is a block diagram illustrating the construction of a system for providing news information by using a 3D character for use in a wireless communication network according to a preferred embodiment of the present invention.

FIG. 1 is a block diagram illustrating the construction of a system for providing news information by using a 3D character for use in a wireless communication network according to a preferred embodiment of the present invention.

As illustrated in FIG. 1, the system according to the preferred embodiment of the present invention includes a wireless communication terminal 100, a wireless communication network 110, a news information-providing server 120, etc.

The wireless communication terminal 100 according to the present invention represents a terminal which is capable of performing telephone communication with a communication partner in a wireless manner via the wireless communication network 110, and retrieving desired information by using an information retrieval function upon accessing the wireless Internet. The wireless communication terminal 100 stores a wireless Internet platform for operating wireless Internet-related applications, and installs therein a wireless Internet access browser for accessing the wireless Internet.

The wireless Internet platform may include a Wireless Internet Platform for Interoperability (hereinafter, referred to as WIPI), a Wireless Internet-Terminal Open Platform (WI-TOP) developed based on the WIPI by SK Telecom, a Java 2 Micro Edition (J2ME), etc. The wireless Internet access browser may use a Microsoft Internet Explorer (MIE) based on a Hypertext Markup Language (HTML) using a Hypertext Transfer Protocol (HTTP), a Handheld Device Transport Protocol (HDTP), an I-mode of NTT Dokomo, a 'NATE' OF SK Telecom, etc., as well as a Wireless Application Protocol (hereinafter, referred to as WAP) browser based on a WAP.

The wireless communication terminal 100 according to the present invention has access to the news information-providing server 120 through the wireless communication network 110, select desired news information, and request the news information-providing server 120 to transmit the selected news information. Further, the wireless communication terminal 100 receives and views 3D character news transmitted in real-time from the news information-providing server 120.

For this, the wireless communication terminal 100 stores software used for viewing the 3D character news, and may use software developed so as to operate in a corresponding platform according to the type of a wireless Internet platform.

The wireless communication terminal 100 according to the present invention is one of various wireless communication terminals such as a Personal Digital Assistant (PDA), a cellular phone, a Personal Communication Service (PCS) phone, a hand-held PC, a Global System for Mobile (hereinafter, referred to as GSM) phone, a Wideband CDMA (hereinafter, referred to as WCDMA) phone, a CDMA-2000 phone, and a Mobile Broadband System (hereinafter, referred to as MBS) phone. The MBS phone represents a wireless communication terminal suited for a 4G system.

The wireless communication network 110 according to the present invention transmits/receives wireless signals containing voice and data, which may include a base transceiver station, a base station controller, a mobile communication switching center, a Packet Data Serving Node (hereinafter, referred to as PDSN), etc.

The base transceiver station corresponds to a network endpoint equipment which performs a wired/wireless conversion, transmission/reception of radio signals, etc., between the wireless communication terminal 100 and the base station controller, and is directly connected to the wireless communication terminal 100. The base station controller supervises the base transceiver station, and performs radio channel allocation and release for the wireless communication terminal 100, transmit power control of the wireless communication terminal 100 and the base transceiver station, determination of soft handoff and hard handoff, transcoding and vocoding, operation and maintenance for a wireless access network, etc.

The mobile communication switching center includes a plurality of electronic exchanges, and performs a processing function for basic and supplementary services, a processing function for incoming and originating calls of a subscriber, a location registration procedure processing function, a handoff procedure processing function, an inter-working function with another network, etc. The PDSN manages a session so that radio data can be provided after being converted into packet data, performs a routing processing function of the packet data, and connects the wireless communication network 110 to a packet data network.

The wireless communication network 110 according to the present invention may include a wireless access network based on various mobile communication network such as an Interim Standard (IS)-95 network, a GSM network, a CDMA 2000 1X network, a CDMA 2000 3X network, a CDMA 2000 Evolution-Data only (EV-DO) network, a WCDMA network, and a Wireless Broadband Internet (WiBro) network.

The news information-providing server 120 according to the present invention generates 3D character news by using real-time new information received from external news content servers, and transmits the 3D character news in real-time through the wireless communication network 110. To achieve this, the news information-providing server 120 analyzes the content of the voice information obtained by converting the received new information into voice data, extracts mouth shape data and facial expression data corresponding to the analyzed content of the voice information, applies the extracted mouth shape data and facial expression data to a 3D character, generates 3D character news by synchronizing 3D character data, which is obtained by synthesizing the 3D character with an background image and/or background music, with the voice information, and provides the wireless communication terminal 100 with the generated 3D character news in a streaming mode. The internal construction of the news information-providing server 120 will be described in detail with reference to FIG. 2.

The news information-providing server 120 may be realized as a network server. Typically, the network server represents a hardware run by computer software (network server program) for connecting to a subordinate device, which performs communications with another network server, through a computer network such as a private intranet and the Internet, accepting an operation request, performing a corresponding operation, and producing results of the operation. Apart from such network server program, the network server includes a series of application programs operating on the network server, and various databases included in the network server if required. Such a network server may be realized by means of network server programs variously provided according to an operating system such as DOS, Windows, Linux, Unix and Macintosh.

Figure 2:
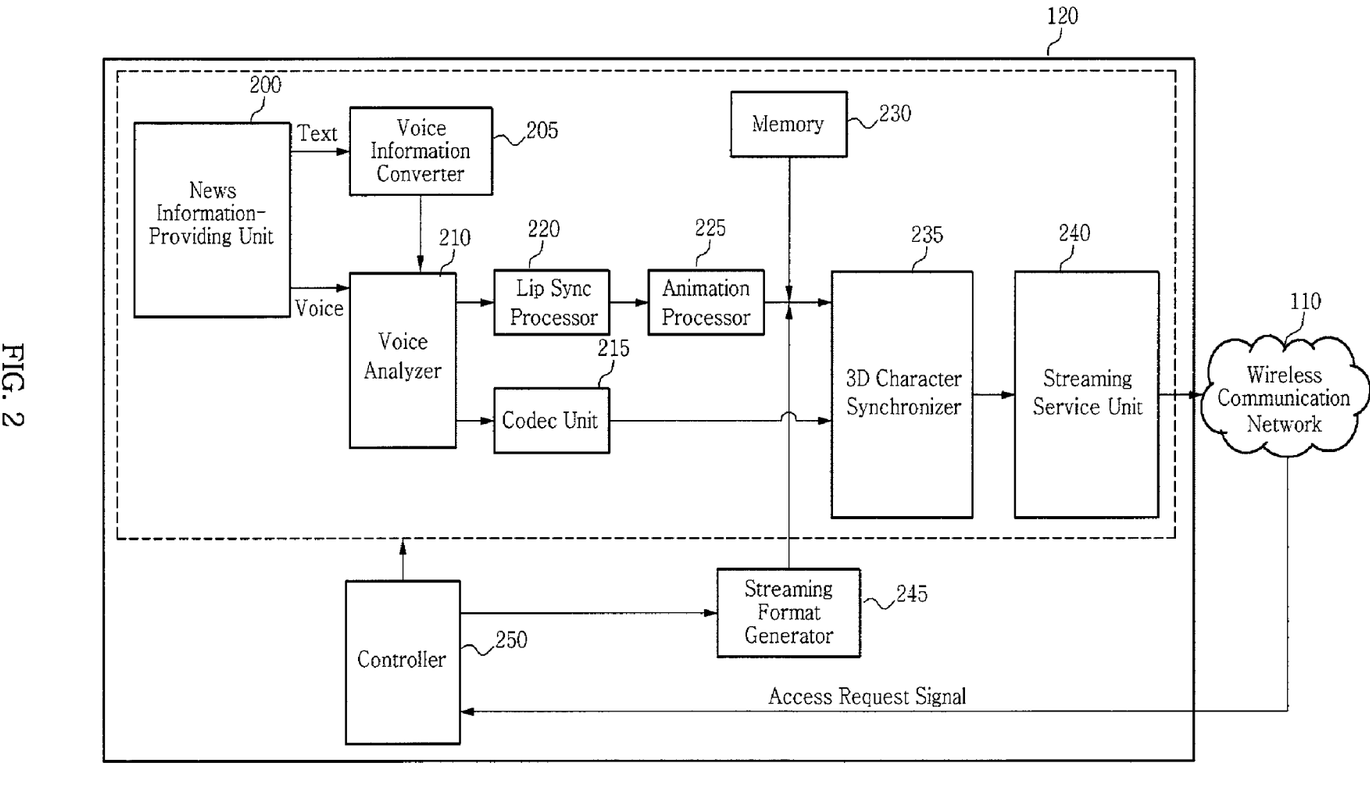
FIG. 2 is a block diagram illustrating the construction of a news information-providing server according to a preferred embodiment of the present invention.

FIG. 2 is a block diagram illustrating the construction of the news information-providing server 120 according to the preferred embodiment of the present invention.

As illustrated in FIG. 2, the news information-providing server 120 according to the present invention may include a news information-providing unit 200, a voice information converter 205, a voice analyzer 210, a codec unit 215, a lip sync processor 220, an animation processor 225, a memory 230, a 3D character synchronizer 235, a streaming service unit 240, a streaming format generator 245, a controller 250, etc.

The news information-providing unit 200 receives real-time news information in the form of text data or voice data from external news content servers, and provides the received news information for the voice information converter 205 and/or the voice analyzer 210.

The voice information converter 205 receives the news information including the text data from the news information-providing unit 200, and generates voice information by converting the text data into the voice data. The voice information converter 205 converts the text data into the voice data by using a Text To Speech (TTS) technology. For this, the voice information converter 205 analyzes the grammatical structure of the inputted text document, generates rhythm along which a person reads sentences, and collects basic units of a phoneme according to the generated rhythm, thereby generating synchronized sound.

The voice analyzer 210 receives the voice information making up the news information from the news information-providing unit 200 or the voice information converter 205, and analyzes the content of the voice information. For example, the voice analyzer 210 analyzes the strength and weakness, the highness and lowness, etc., of sound in the received voice information, and compares the analyzed results with voice material stored in the database of the voice analyzer 210, thereby determining a linguistic meaning contained in the voice.

The codec unit 215 converts the voice information through a voice coding process in order to enhance the sound quality of the voice information. Herein, the codec unit 215 may employ various codec schemes such as an Enhanced Variable Rate Codec (EVRC), an Improved Multi-Band Excitation (IMBE), a Department of Defense Code Excited Linear prediction (DoD-CELP), a Vector Sum Excited Linear prediction (VSELP), a Qualcomm Code Excited Linear prediction (QCELP), a Low Delay CELP (LD-CELP), an Adaptive Differential Pulse Code Modulation (ADPCM), an A-law, and a μ-law.

The lip sync processor 220 extracts mouth shape data corresponding to the content of the voice information analyzed by the voice analyzer 210 in order to realize the mouth shape of a 3D character resembling an announcer reading the news. The animation processor 225 extracts facial expression data corresponding to the content of the voice information analyzed by the voice analyzer 210 in order to change the facial expression of the 3D character. That is, the animation processor 225 can extract facial expression data, which involves the eye, mouth, eyebrow, nose, facial muscle, etc., of the 3D character for expressing pleasure, amazement, sadness, etc., according to the content of the voice information analyzed by the voice analyzer 210. The memory 230 stores a plurality of 3D characters, background images, background music, etc., in order to provide the 3D character news service of the present invention, which may be realized by various data storage units such as a hard disk, a flash memory and a RAM.

The 3D character synchronizer 235 receives the mouth shape data and the facial expression data from the lip sync processor 220 and the animation processor 225, receives the voice information from the codec unit 215, and receives the 3D character, background images and background music from the memory 230. The 3D character synchronizer 235 applies the mouth shape data and the facial expression data to the 3D character, generates 3D character data by synthesizing the 3D character with the background image and/or the background music, and generates 3D character news by synchronizing the generated 3D character data with the voice information in order to enable the 3D character to move according to the voice information.

The streaming service unit 240 transmits the 3D character news generated by the 3D character synchronizer 235 to the wireless communication terminal 102 via the wireless communication network 110 in a streaming mode in order to realize real-time transmission.

If another wireless communication terminal 104 accesses the news information-providing server 120 and requests the service in the middle of providing the 3D character news to the wireless communication terminal 102, the streaming format generator 245 generates streaming format data for providing the wireless communication terminal 104 with the 3D character news to be provided to the wireless communication terminal 102, and transfers the streaming format data to the 3D character synchronizer 235. Herein, the streaming format data include sync marks which periodically (e.g. 1 to 3 seconds) occur from the time point at which the wireless communication terminal 104 has requested the service. The streaming format generator 245 requests synchronization of the 3D character news based on the sync marks. Then, the 3D character synchronizer 235 synchronizes the 3D character data with the voice information based on the sync marks of the streaming format data. Accordingly, the wireless communication terminal 104 employs the sync mark as a reference time point even when accessing the news information-providing server 120 while the 3D character news are provided to the wireless communication terminal 102, and can receive the 3D character news from the reference time point.

The controller 250 generally manages and controls the elements of the news information-providing server 120 as described above, generates the 3D character news by means of the news information received in real-time, and controls the 3D character news to be transmitted to the wireless communication terminal 102 through the wireless communication network 110. Further, if a news information request is received from the wireless communication terminal 104, the controller 250 controls the streaming format generator 245 to generate the streaming format data, and controls the streaming service unit 240 to provide the wireless communication terminal 104 with the 3D character news, starting from the time point at which the wireless communication terminal 104 has accessed the news information-providing server 120.

Figure 3:
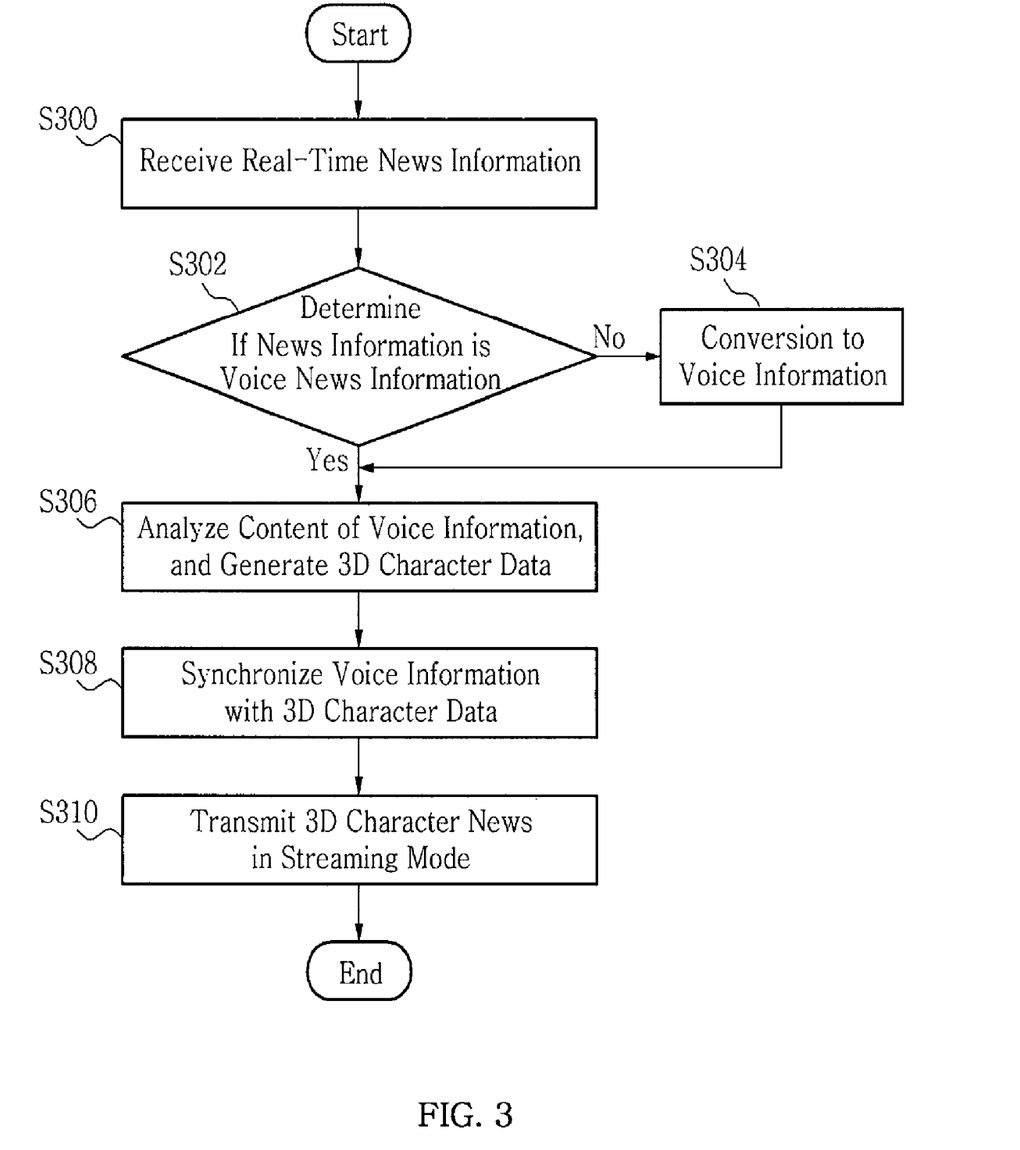
FIG. 3 is a flow diagram illustrating a method by which a news information-providing server provides news information by using a 3D character according to a preferred embodiment of the present invention.

FIG. 3 is a flow diagram illustrating a method by which the news information-providing server 120 provides the news information by using the 3D character according to the preferred embodiment of the present invention.

The news information-providing server 120 of the present invention receives the real-time news information from external news content servers, generates the 3D character news, and provides the 3D character news in real-time to the wireless communication terminal 100 having accessed the news information-providing server 120 through the wireless communication network 110. Hereinafter, a process in which the news information-providing server 120 provides the 3D character news will be described in detail.

As illustrated in FIG. 3, the news information-providing unit 200 of the news information-providing server 120 receives a plurality of real-time news information including text data or voice data from the external news content servers (S300). Then, the news information-providing unit 200 determines if the received news information corresponds to text data or voice data (S302). If the received news information corresponds to the text data, the voice information converter 205 converts the news information into the voice information, and transfers the voice information to the voice analyzer 210 (S304). However, if the received news information corresponds to the voice data, the received news information is directly transferred to the voice analyzer 210 without the voice conversion process.

The voice analyzer 210 analyzes the content of the received voice information, and transfers the analyzed content to the lip sync processor 220 and the animation processor 225. The lip sync processor 220 extracts the mouth shape data corresponding to the analyzed content of the voice information, and the animation processor 225 extracts the facial expression data, which relate to eyes, a mouth, eyebrows, etc., corresponding to the analyzed content of the voice information. If the mouth shape data and the facial expression data used for expressing the 3D character are extracted, the mouth shape data and the facial expression data are applied to the 3D character by means of 3D characters, background images and background music, etc., which are stored in the memory 230 of the news information-providing server 120, and the 3D character data are generated by synthesizing the 3D character with the background image and/or the background music (306). Further, the voice information of the voice analyzer 210 is also transferred to the codec unit 215. The codec unit 215 converts the voice information through a voice coding process in order to elevate the sound quality of the voice information.

The 3D character data and the voice information are transferred to the 3D character synchronizer 235, and the 3D character news are generated through synchronization of the 3D character data and the voice information so that the 3D character can move according to the voice information (308). Then, the 3D character news, which are generated by means of the news information received in real-time, are transmitted from the streaming service unit 240 in a streaming mode via the wireless communication network 110 (310). In this way, the users of the wireless communication terminal 100 can select and view desired 3D character news.

In the meantime, the news information-providing server 120 of the present invention can provide a menu screen used for providing the 3D character news service of the present invention to the wireless communication terminal 100 having accessed the news information-providing server 120 through the wireless communication network 110. The menu screen may include a news selection menu and a screen setup menu.

The news selection menu is classified into politics, economy, society, entertainment, sports, etc., according to each category. Accordingly, the users of the wireless communication terminal 100 can select desired news information, and receive and view the 3D character news generated and transmitted in real-time.

The screen setup menu enables the 3D characters, background images and background music used for generation of the 3D character news to be selected, and enables the 3D character news service, which satisfies the tastes of the users of the wireless communication terminal 100, to be provided. That is, the users of the wireless communication terminal 100 set the 3D characters, background images and background music in the screen setup menu before viewing of the 3D character news service according to the present invention, so that they can receive the selected news information through the 3D character news expressed by the 3D character set by them.

Figure 4:
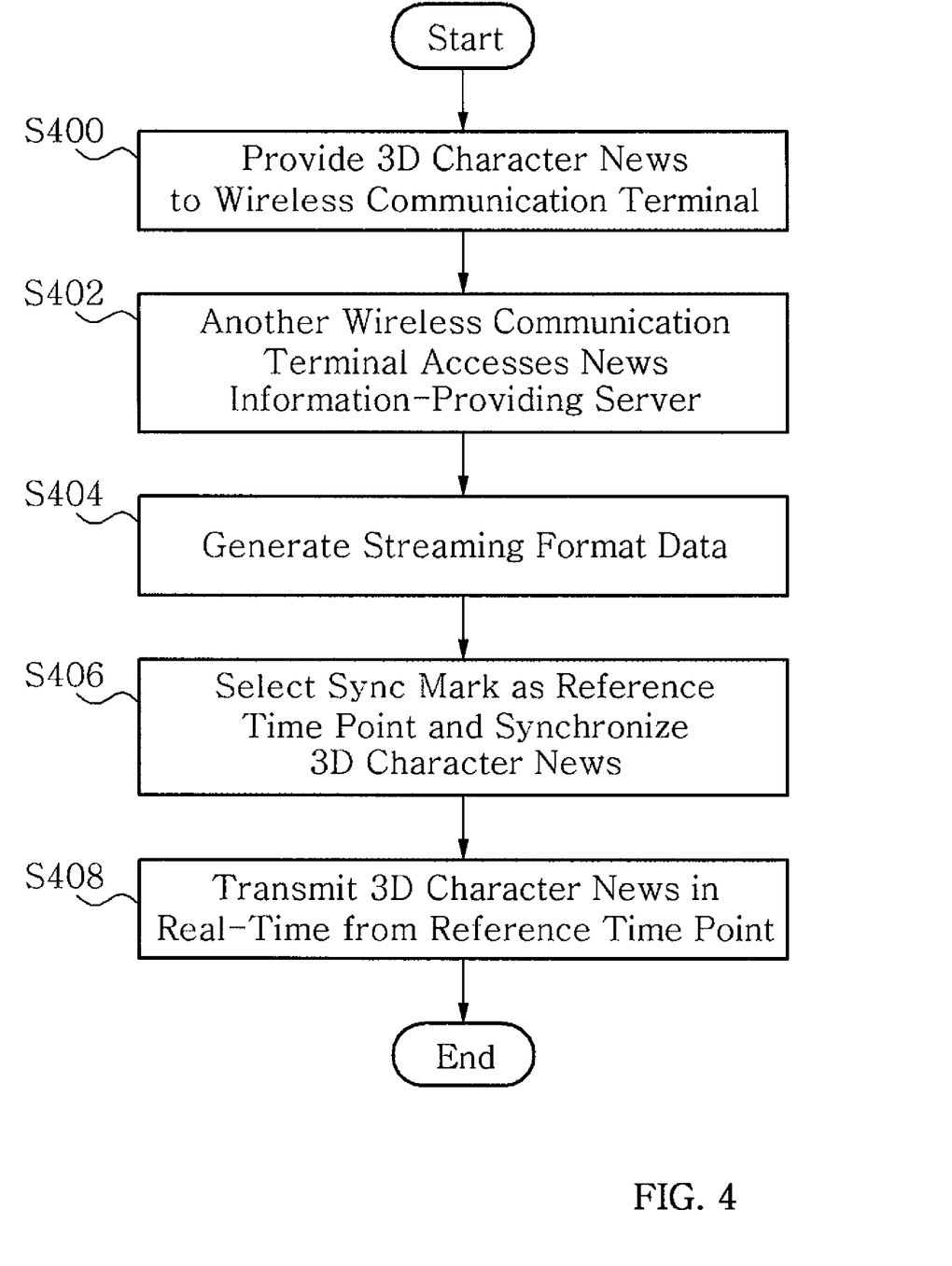
FIG. 4 is a flow diagram illustrating a method by which a news information-providing server provides 3D character news to a different wireless communication terminal having accessed the news information-providing server while providing the 3D character news according to a preferred embodiment of the present invention.

FIG. 4 is a flow diagram illustrating a method by which the news information-providing server 120 provides the 3D character news to the different wireless communication terminal 104 having accessed the news information-providing server 120 while providing the 3D character news according to the preferred embodiment of the present invention.

As illustrated in FIG. 4, the news information-providing server 120 receives the news information in real-time, generates the 3D character news, and transmits the 3D character news through the wireless communication network 110, thereby enabling the wireless communication terminal 102 to receive and display the 3D character news (S400). While the news information-providing server 120 provides the 3D character news in real-time, the wireless communication terminal 104 may also access the news information-providing server 120 and request news information (S402). In such a case, the controller 250 of the news information-providing server 120 receives an access request signal of the wireless communication terminal 104 through the wireless communication network 110, and the streaming format generator 245 generates the streaming format data used for synchronizing the 3D character news during broadcasting under the control of the controller 250 so that the 3D character news can be provided to the wireless communication terminal 104, and transfers the streaming format data to the 3D character synchronizer 235 (S404).

The 3D character synchronizer 235 selects one of the sync marks included in the streaming format data as a reference time point, and synchronizes the 3D character data with the voice information (S406). The synchronized 3D character news are transmitted in real-time to the wireless communication terminal 104 through the streaming service unit 240, so that the wireless communication terminal 104 can display the 3D character news from the reference time point (S408). Accordingly, the wireless communication terminal 104, which has accessed the news information-providing server 120 in the middle of providing the 3D character news in real-time to the wireless communication terminal 102, can receive the 3D character news from a predetermined segment of the news, which corresponds to the time point at which the wireless communication terminal 104 has requested the service.

Figure 5:
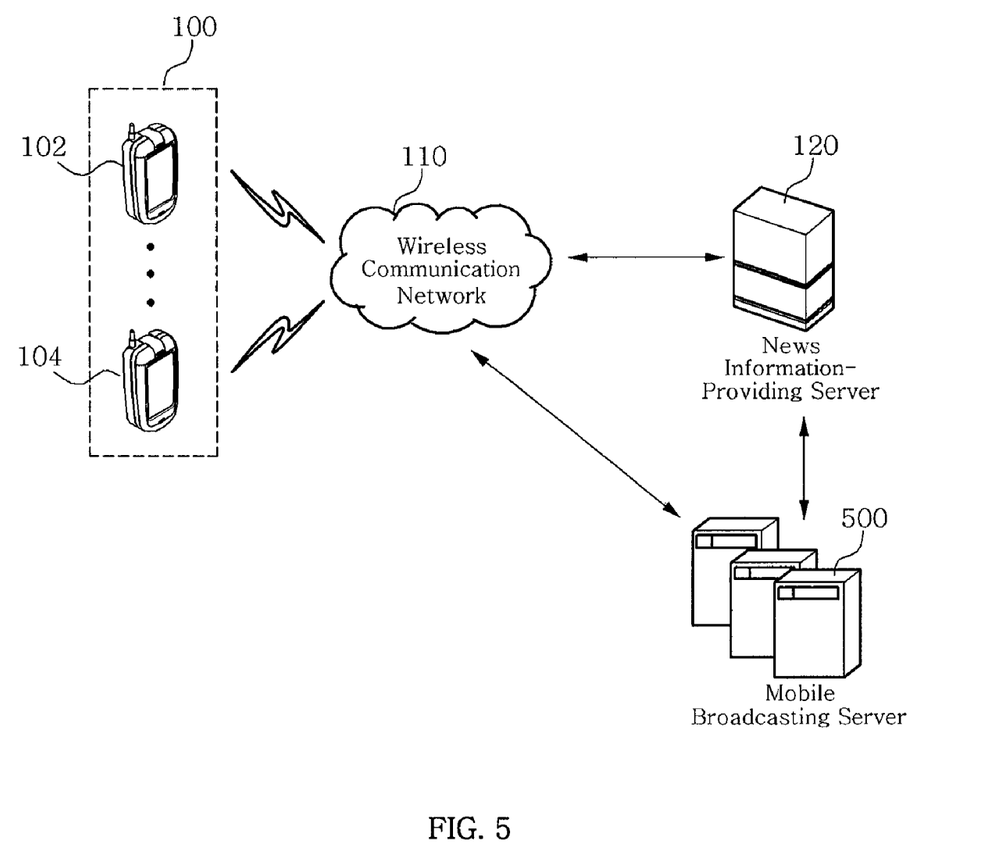
FIG. 5 is a block diagram illustrating the construction of a system for providing 3D character news information by means of a mobile broadcasting server according to a preferred embodiment of the present invention.

FIG. 5 is a block diagram illustrating the construction of a system for providing 3D character news information by means of a mobile broadcasting server according to the preferred embodiment of the present invention.

The system for providing the 3D character news information in FIG. 5 may include the wireless communication terminal 100, the wireless communication network 110, the news information-providing server 120, the mobile broadcasting server 500, etc. Hereinafter, a description about the elements for performing the same functions as those of the elements in FIG. 1 will be omitted.

The mobile broadcasting server 500 receives personal news information, generates 3D character news from the personal news information, and transfers the 3D character news to the news information-providing server 120 so that the 3D character news can be provided to the wireless communication terminal 100. The personal news information may be received from the wireless communication terminal 100 through the wireless communication network 110, and may include various information inputted from various terminals, such as desktop computers and notebook computers, through a wired communication network.

Further, the mobile broadcasting server 500 may receive news information from the news information-providing unit 200 of the news information-providing server 120, generate secondary news information by modifying or adding the content of the news information, and transmit the secondary news information to the news information-providing unit 200 of the news information-providing server 120 so that the secondary news information can be provided through the 3D character news service.

Accordingly, it is possible to generate the 3D character news based on news information created by wireless communication service subscribers itself, as well as news information provided by a wireless communication service provider through the mobile broadcasting server 500, and to provide the generated 3D character news.

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

INDUSTRIAL APPLICABILITY

As described above, the present invention can provide desired news information through a wireless communication network regardless of place and time, and provide news information expressed by a 3D character, thereby providing a news service, which gives an effect like when a TV announcer actually performs a broadcast, through a wireless communication service.

Further, according to the present invention as described above, in the middle of providing a 3D character news service to a wireless communication terminal, even when another wireless communication terminal accesses a news information-providing server, it is possible to provide said another wireless communication terminal with the 3D character news service starting from a predetermined segment of news, which corresponds to the access time point of said another wireless communication terminal. Furthermore, it is possible to provide news information created by wireless communication service subscribers itself through 3D character news.

The invention claimed is:
1. A method for providing a news information, the method comprising the steps of:
(a) receiving a news information request from a second accessed wireless communication terminal in the middle of providing a 3-dimensional (3D) character news to a first accessed wireless communication terminal, and generating streaming format data;

(b) selecting sync mark included in the streaming format data as a reference time point, and generating the 3D character news by synchronizing 3D character data with voice information by using the streaming format data, the voice information being generated by converting a received new information into voice data, the 3D character data being obtained by synthesizing a 3D character with an background image and/or background music; and (c) transmitting the 3D character news to the second accessed wireless communication terminal in a streaming mode, starting from the reference time point.

2. The method as claimed in claim 1, wherein one of the sync marks, which periodically occur from a time point at which the news information request is received from the second wireless communication terminal, is selected as the reference time point.

3. The method as claimed in claim 1, wherein the 3D character news is transmitted in real-time.

4. A system for providing news information, the system comprising:
- a news information-providing unit for receiving news information having a form of text data or voice data;
- a voice information converter for converting the news information including the text data into voice data;
- a voice analyzer for receiving voice information making up the news information from the news information-providing unit or the voice information converter, and for analyzing content of the voice information;
- a lip sync processor for extracting mouth shape data corresponding to the content of the voice information analyzed by the voice analyzer;
- an animation processor for extracting facial expression data corresponding to the content of the voice information analyzed by the voice analyzer;
- a codec unit for converting the voice information, which is received from the voice analyzer, through a voice coding process;
- a memory for storing a 3-dimensional (3D) character, background images and background music;
- a 3D character synchronizer for applying the mouth shape data and the facial expression data to the 3D character, generating 3D character data by synthesizing the 3D character with the background image and/or the background music, and generating 3D character news by synchronizing the voice information outputted from the codec unit with the 3D character data;
- a streaming service unit for transmitting the 3D character news to a first accessed wireless communication terminal in a streaming mode;
- a controller for controlling an operation of the system so that the 3D character news are generated and transmitted to the wireless communication terminal; and
- a streaming format generator for, if a news information request is received from a second accessed wireless communication terminal in the middle of providing the 3D character news to the first wireless communication terminal, generating the streaming format data used for synchronizing the 3D character news so that the 3D character news are provided to the second wireless communication terminal, and transferring the streaming format data to the 3D character synchronizer.

5. The system as claimed in claim 4, wherein the 3D character synchronizer selects one of sync marks included in the streaming format data as a reference time point, and generates the 3D character news by synchronizing the 3D character data with the voice information.

6. The system as claimed in claim 5, wherein the 3D character synchronizer selects one of the sync marks, which periodically occur from a time point at which the news information request is received from the second wireless communication terminal, as the reference time point.

7. The system as claimed in claim 4, further comprising:
- a mobile broadcasting server for receiving personal news information, generating the 3D character news from the personal news information, and transferring the 3D character news to the news information-providing server.

8. The system as claimed in claim 7, wherein the mobile broadcasting server receives the news information from the news information-providing unit, generates secondary news information by processing the received news information, and transfers the secondary news information to the news information-providing unit.

9. The system as claimed in claim 4, wherein the facial expression data include eye, mouth, eyebrow, nose and facial muscle data for expressing feelings of the 3D character according to the content of the voice information.

10. The method as claimed in claim 4, wherein the news information is provided in real-time from the news information-providing unit.

* * * * *